(12) United States Patent  
Takeda

(10) Patent No.: US 7,667,887 B2  
(45) Date of Patent: Feb. 23, 2010

(54) LIGHT SCANNING DEVICE, METHOD FOR CONTROLLING LIGHT SCANNING DEVICE, AND IMAGE DISPLAY DEVICE

(75) Inventor: Takashi Takeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 884 days.

(21) Appl. No.: 11/279,969

(22) Filed: Apr. 17, 2006

(65) Prior Publication Data

US 2006/0245462 A1 Nov. 2, 2006

(30) Foreign Application Priority Data

Apr. 18, 2005 (JP) ............................. 2005-119331  
Jan. 31, 2006 (JP) ............................. 2006-021977

(51) Int. Cl.  
*G02B 26/08* (2006.01)  
*G02B 26/10* (2006.01)

(52) U.S. Cl. .................................. 359/298; 359/202.1

(58) Field of Classification Search .............. 359/202.1, 359/224.1, 225.1, 226.2, 290, 298

See application file for complete search history.

(56) References Cited

U.S. PATENT DOCUMENTS 6,731,320 B1 5/2004 Allen et al.

FOREIGN PATENT DOCUMENTS

JP A 2001-158127 6/2001  
JP A 2003-207730 7/2003

*Primary Examiner*—William C Choi  
(74) *Attorney, Agent, or Firm*—Oliff & Berridge, PLC

(57) ABSTRACT

A light scanning device that projects light beams modulated in response to image signals. The light scanning device includes: a light source that emits the light beams; a scanner that scans the light beams from the light source in a first direction and a second direction substantially perpendicular to the first direction; a pixel-timing-signal generating section that generates a pixel timing signal indicative of a timing at which the light beam enters for every pixel region to be formed in response to the image signals; a pulse-signal generating section that generates a pulse signal having a pulse width corresponding to time shorter than the shortest of the time during which the light beam passes through the pixel region on the basis of the pixel timing signal; and a driving-signal generating section that generates a driving signal for driving the light source in accordance with the pulse signal and the image signal.

13 Claims, 17 Drawing Sheets

LIGHT SCANNING DEVICE, METHOD FOR CONTROLLING LIGHT SCANNING DEVICE, AND IMAGE DISPLAY DEVICE

BACKGROUND

1. Technical Field

The present invention relates to a light scanning device, a method for controlling the light scanning devices and an image display device and, in particular, to a technique for light scanning devices that scan laser light modulated according to image signals.

2. Related Art

Laser-light scanning devices are generally used in image display devices that display images with scanned laser light. The light scanning devices emit laser light modulated in response to image signals in two dimensions. The image display devices display images on screens or the like with laser light scanned from the light scanning devices. An example of the techniques of light scanning devices for displaying images with laser light is disclosed in Patent Document 1: JP-A 2003-207730.

Light scanning devices generate light-source driving signals using pixel timing signals indicative of timings at which laser light enters for every pixel region. The use of the pixel timing signals allows laser light modulated in response to image signals to enter correct positions even if the linear velocity of the laser light changes. However, even when an approximately even amount of laser light is emitted in the case where the linear velocity of the laser light changes, the amount of laser light radiated to a target region shows an uneven distribution. When a light source is driven by an analog system in which the pulse amplitude is controlled in response to image signals, the brightness changes irrespective of the pulse amplitude because of changes in laser-light irradiation time per pixel. For example, when laser light is reciprocated in one dimension of two dimensions, laser-light scanning is slower at both ends and faster in the center, which shows such a distribution of light that it is light at both ends and dark in the center. Also when a light source is driven by a digital system in which the pulse width is controlled in response to image signals, the brightness changes irrespective of the pulse width because of changes in laser-light irradiation time per pixel. Furthermore, the digital system may sometimes cause the problem that the pulse width modulation (hereinafter, referred to as PWM) cannot keep pace with the pixel timing signals. Means for preventing such a problem includes controlling the driving of the light source to changes in the linear velocity of the laser light. In this case, the driving of the light source is controlled on the basis of the linear velocity of the laser light which is determined for each pixel by calculation, which requires complicated control of the light source. As described above, the known technique has the problem of difficulty in emitting light beams with a preferable distribution by simple control.

SUMMARY

Accordingly, an advantage of some aspects of the invention is to provide a light scanning device capable of scanning light beams with a preferable distribution by simple control, a method for controlling the light scanning device, and an image display device including the light scanning device.

According to a first aspect of the invention, there is provided a light scanning device that scans light beams modulated in response to image signals. The light scanning device includes: a light source that emits the light beams; a scanning section that scans the light beams from the light source in a first direction and a second direction substantially perpendicular to the first direction; a pixel-timing-signal generating section that generates a pixel timing signal indicative of a timing at which the light beam enters for every pixel region to be formed in response to the image signals; a pulse-signal generating section that generates a pulse signal having a pulse width corresponding to time shorter than the shortest of the time during which the light beam passes through the pixel region on the basis of the pixel timing signal; and a driving-signal generating section that generates a driving signal for driving the light source in accordance with the pulse signal and the image signal.

The driving-signal generating section generates a driving signal on the basis of the pulse signal generated by the pulse-signal generating section. The pulse-signal generating section sets the pulse width for the time shorter than the shortest of the time during which the light beam passes the pixel region. The driving-signal generating section can generate a driving signal for all the pixels with reference to pulse signals with the same pulse width. Accordingly, even when the linear velocity of the light beam changes, substantially even light beams can be projected without deviation. Since the driving signal is generated using a pixel timing signal, light with preferable light distribution can be projected to the pixel regions. The light scanning device can generate a driving signal in such a simple way that it performs calculation using the linear velocity of laser light only for determining the pulse width of a pulse signal, and thereafter generates a driving signal using a pulse signal synchronized with the pixel timing signal. This makes it easier to control the light source than controlling the light source on the basis of the linear velocity calculated for each pixel. This also facilitates generating a driving signal corresponding to changes in linear velocity of laser light. Consequently, a light scanning device can be provided which is capable of scanning light beams with preferable distribution by simple control.

It is preferable that the driving-signal generating section generate the driving signal whose amplitude is controlled in accordance with the image signal. Since the pulse width is set shorter than the shortest of the time during which the light beam passes through the pixel region, changes in light-beam protection time per pixel can be reduced for an analog system in which amplitude is controlled. Thus the amount of light beams can be controlled correctly by amplitude control.

It is preferable that the driving-signal generating section generate the driving signal whose pulse width is controlled in accordance with the image signal. Since the pulse width is set shorter than the shortest of the time during which the light beam passes through the pixel region, changes in light-beam projection time per pixel can be reduced for a digital system in which a pulse width is controlled. Thus the amount of light beams can be controlled correctly by pulse-width control.

It is preferable that the driving-signal generating section generate the driving signal in accordance with the image signal that is an analog signal. Accordingly, the amount of light beams can be controlled correctly on the basis of an analog image signal.

It is preferable that the driving-signal generating section generate the driving signal in accordance with the image signal that is a digital signal. Accordingly, the amount of light beams can be controlled correctly on the basis of a digital image signal.

It is preferable that the pulse-signal generating section generate a pulse signal having a pulse width corresponding to time shorter than the time during which the light beam passes through the pixel region when both of the velocity at which the light beam is scanned in the first direction and the velocity at which the light beam is scanned in the second direction are the maximum. For example, when light beams is deflected in the first direction and the second direction by turning a reflecting mirror around a rotation axis of the reflecting mirror, the linear velocities of the light beams change in both of the first and second directions. When the linear velocities of the light beams are the maximum in both of the first and second direction, the time during which the light beams pass through the pixel region become the shortest. Since the pulse width is set shorter than the time during which light beams pass through the pixel region when the linear velocities of the light beams are the maximum in both of the first and second direction, substantially even light beams can be projected in two dimensions. Consequently, preferable light distribution can be provided in two dimensions.

It is preferable that the scanning section be driven so that the frequency at which the light beam is scanned in the first direction is higher than that at which the light beam is scanned in the second direction, and so as to reciprocate the light beam in the second direction. When light beams are reciprocated in the second direction, the linear velocity of the light beam in the second direction may change. Consequently, preferable light distribution can be provided when a light beam is reciprocated in the second direction.

It is preferable that the scanning section be driven so that the frequency at which the light beam is scanneded in the first direction is higher than that at Which the light beam is scanneded in the second direction, and so as to scan the light beam in one direction in the second direction. When a light beam is scanned in one direction in the second direction, the linear velocity of the light beam in the second direction may change. Consequently, preferable light distribution can be provided when a light beam is scanned in one direction in the second direction.

It is preferable that the light source emit a plurality of the light beams of the same color; that the scanning section scans the plurality of the light beams of the same color in line; and that the pulse-signal generating section generates a pulse signal for the plurality of the light beams of the same color, the pulse signal having a pulse width corresponding to the time shorter than the shortest of the time during which one of the plurality of the light beams of the same color passes through the pixel region. The light beams of the same color indicate light beams having the same or approximate wave-length region. A pulse signal having a pulse width calculated for one light beam is generated for all the light beams. This makes it easier to control the light source unit than calculating a pulse width for every light beam, thereby providing preferable light distribution by simple control in scanning a plurality of light beams of the same color.

It is preferable that the light scanning device have a plurality of the scanning sections; and that the pulse-signal generating section generate a pulse signal to each of light beams scanned by the plurality of scanning sections, the pulse width having a pulse width corresponding to the time shorter than the shortest of the time during which one light beam scanned by one of the plurality of scanning sections passes through the pixel region. For example, in scanning light beams with a plurality of scanning sections that scans light beams at roughly the same speed, a pulse width is calculated for one light beam scanned by one of the scanning section. A pulse signal having the pulse width calculated for one laser light is generated for all the light beams This makes it easier to control the light source unit than calculating a pulse width For every light beam, thereby making it easier to control the light source than calculating all the light beams. This can provide preferable light distribution by simple control in scanning light beams using a plurality of scanning sections.

It is preferable that the scanning section include a first scanning section and a second scanning section; and that the pulse-signal generating section generate a first pulse signal for the light beams scanned by the first scanning section and a second pulse signal for the light beams scanned by the second scanning section, the first pulse signal having a pulse width corresponding to the time shorter than the shortest of the time during which one of the light beams scanned by the first scanning section passes through the pixel region, and the second pulse signal having a pulse width corresponding to the time shorter than the shortest of the time during which one of the light beams scanned by the second scanning section passes through the pixel region. Generating pulse signals using the shortest-pulse signal calculated for every scanning section provides substantially even light distribution for every scanning section, thereby providing preferable light distribution using a pulse signal set for each scanning section.

According to a second aspect of the invention, there is provided a method for controlling a light scanning device that scans light beams modulated in response to image signals. The method includes: emitting the light beams; scanning the light beams emitted in the light emitting step in a first direction and a second direction substantially perpendicular to the first direction; generating a pixel timing signal indicative of a timing at which the light beam enters for every pixel region to be formed in response to the image signals; generating a pulse signal having a pulse width corresponding to time shorter than the shortest of the time during which the light beam passes through the pixel region on the basis of the pixel timing signal; and generating a driving signal for driving the light source in accordance with the pulse signal and the image signal.

In the driving-signal generating step, a driving signal is generated on the basis of the pulse signal generated in the pulse-signal generating step. In the pulse-signal generating step, the pulse width is set to the time shorter than the shortest of the time during which a light beam pass through the pixel region. The driving signal can be generated for all the pixels with reference to pulse signals with the same pulse width. Accordingly, even when the linear velocity of the light beam changes, substantially even light beams can be scanned without deviation. Since the driving signal is generated using a pixel timing signal, light with preferable distribution can be scanned to the pixel regions. By the control method of the invention, the light scanning device can generate a driving signal in such a simple manner that it performs calculation using the linear velocity of a light beam only for determining the pulse width of a pulse signal, and thereafter generates a driving signal using a pulse signal synchronized with the pixel timing signal. This makes it easier to control the light source unit than that using the linear velocity calculated for each pixel, thereby providing preferable light distribution by simple control.

According to a third aspect of the invention, there is provided an image display device for displaying images with the light from a light scanning device. The light scanning device is the above-described light scanning device. The use of the light scanning device allows light beams to be scanned with preferable light distribution by simple control. This offers an image display device capable of displaying high-quality image with preferable light distribution by simple control.

BRIEF DESCRIPTION OF THE DRAWINGS

The invention will be described with reference to the accompanying drawings, wherein like numbers refer to like elements.

DESCRIPTION OF EXEMPLARY EMBODIMENTS

The invention will be described with reference to the accompanying drawings, wherein like numbers reference like elements.

First Embodiment

Figure 1:
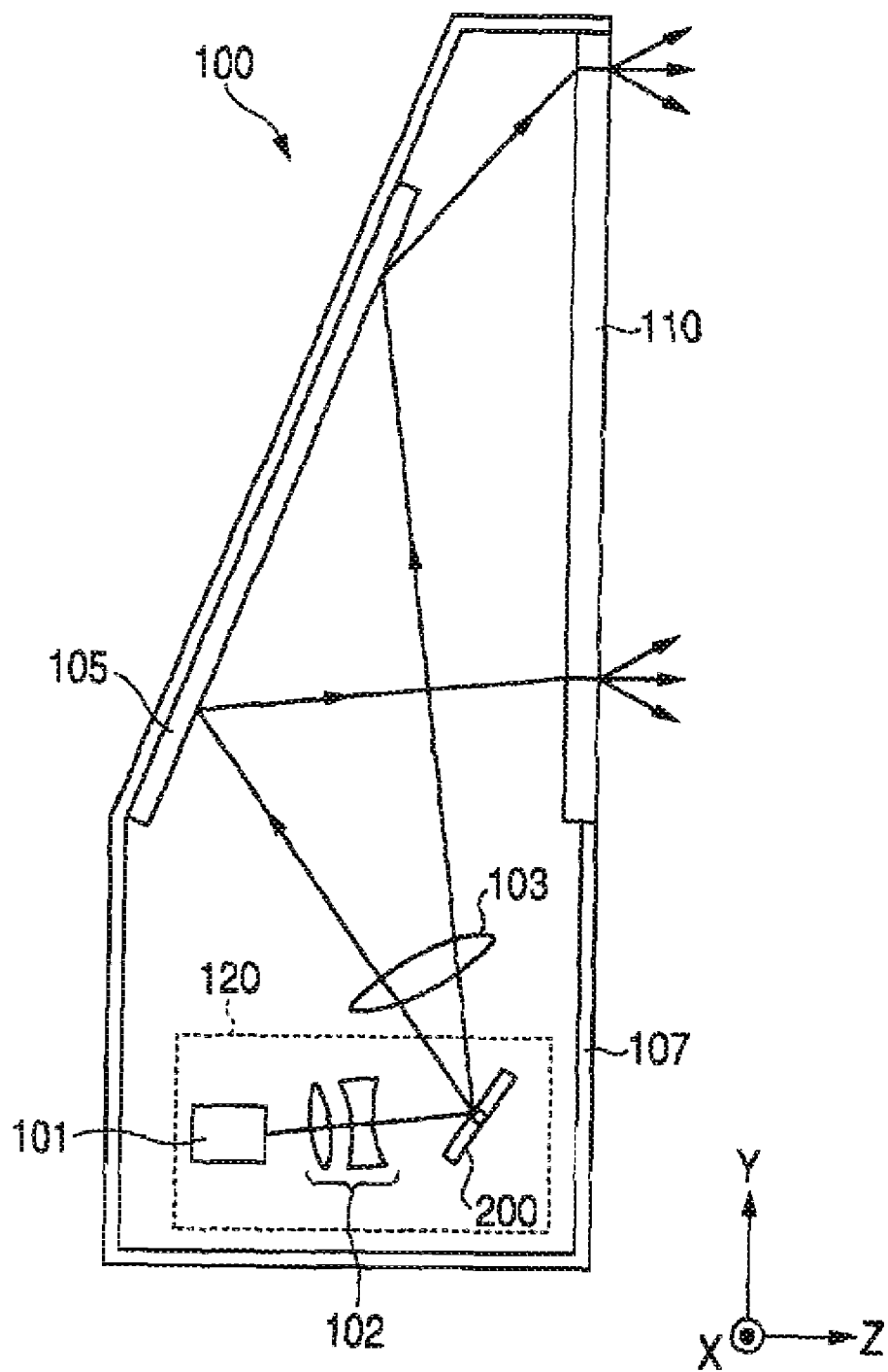
FIG. 1 is a diagram showing a schematic configuration of an image display device according to a first embodiment of the invention.

FIG. 1 shows a schematic configuration of an image display device 100 according to a first embodiment of the invention. The image display device 100 is what is called a rear projector that scans laser light onto one surface of a screen 110 for image viewing with the light exiting from the other surface of the screen 110. A light scanning device 120 disposed in the image display device 100 scans laser light modulated in response to an image signal. The image display device 100 displays images by allowing the laser light from the light scanning device 120 to pass through the screen 110.

A light source 101 disposed in the light scanning device 120 modulates laser beams in response to an image signal and provides them. The light source 101 can be a semiconductor laser or a solid-state laser having a modulator for modulating laser light. The light source 101 modulates laser light by amplitude modulation. The image display device 100 displays a color image composed of R (red) light, G (green) light, and B (blue) light scanned from the light scanning device 120. The light projection device 120 thus has a light source for each of R light, G light, and B light. In this embodiment, however, a structure for providing a single color light will be illustrated and described. Although this embodiment is described for the structure using a single light source, a plurality of light sources for color lights may be used.

The laser light from the light source 101 passes through a projection system 102 and is then incident on a scanner 200. The scanner 200 deflects the laser light from the light source 101. The projection system 102 disposed between the light source 101 and the scanner 200 and a projection system 103 disposed between the scanner 200 and the screen 110 form an image with the laser light from the light source 101 onto the screen 110. The use of the projection systems 102 and 103 allows a high-definition image to be displayed on the screen 110.

Figure 2:
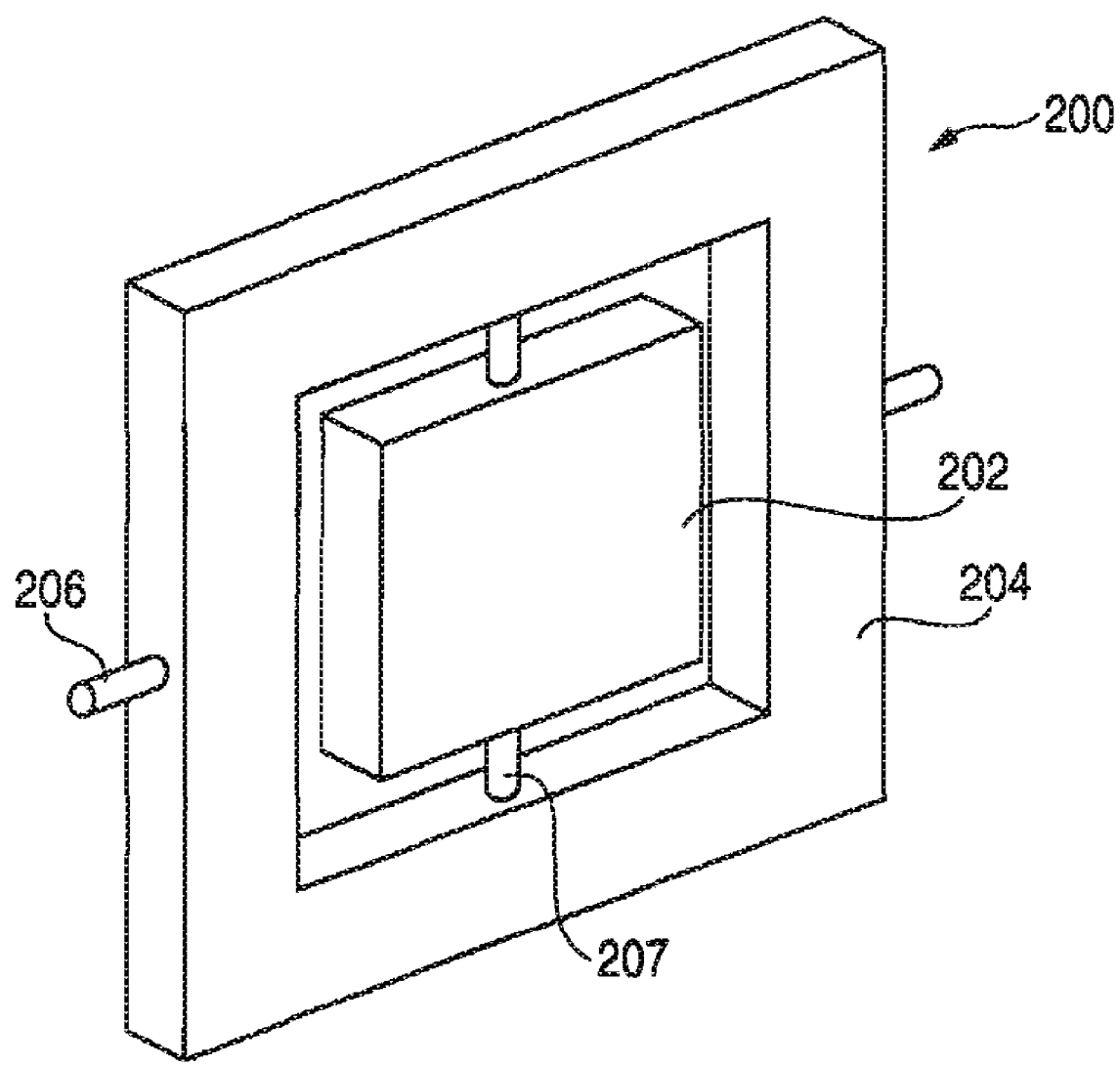
FIG. 2 is a diagram showing a schematic configuration of a scanner (a scanning section).

FIG. 2 shows a schematic structure of the scanner 200. The scanner 200 has what is called a double gimbal structure having a reflecting mirror 202 and an outer frame 204 around the reflecting mirror 202. The outer frame 204 is joined to a fixing portion (not shown) with a torsion spring 206, or a rotation shaft. The outer frame 204 turns around the torsion spring 206 by the torsion and the returning force to the initial position of the torsion spring 206. The reflecting mirror 202 is joined to the outer frame 204 with a torsion spring 207, or a rotation shaft that is substantially perpendicular to the torsion spring 206. The reflecting mirror 202 reflects the laser light from the light source 101. The reflecting mirror 202 is coated with a high-reflection member, such as a metallic thin film made of aluminum or silver.

As the outer frame 204 turns around the torsion spring 206, the reflecting mirror 202 is displaced so as to deflect the laser light in the Y direction on the screen 110 (refer to FIG. 1). The reflecting mirror 202 is also turned around the torsion spring 207 by the torsion and the returning force of the torsion spring 207. The reflecting mirror 202 is also displaced so as to deflect the laser light reflected by the reflecting mirror 202 in the X direction by turning around the torsion spring 207. The scanner 200 thus deflects the laser light from the light source 101 in the X direction, or a first direction, and in the Y direction, or a second direction that is substantially perpendicular to the first direction, on the screen 110 to be irradiated.

Figure 3:
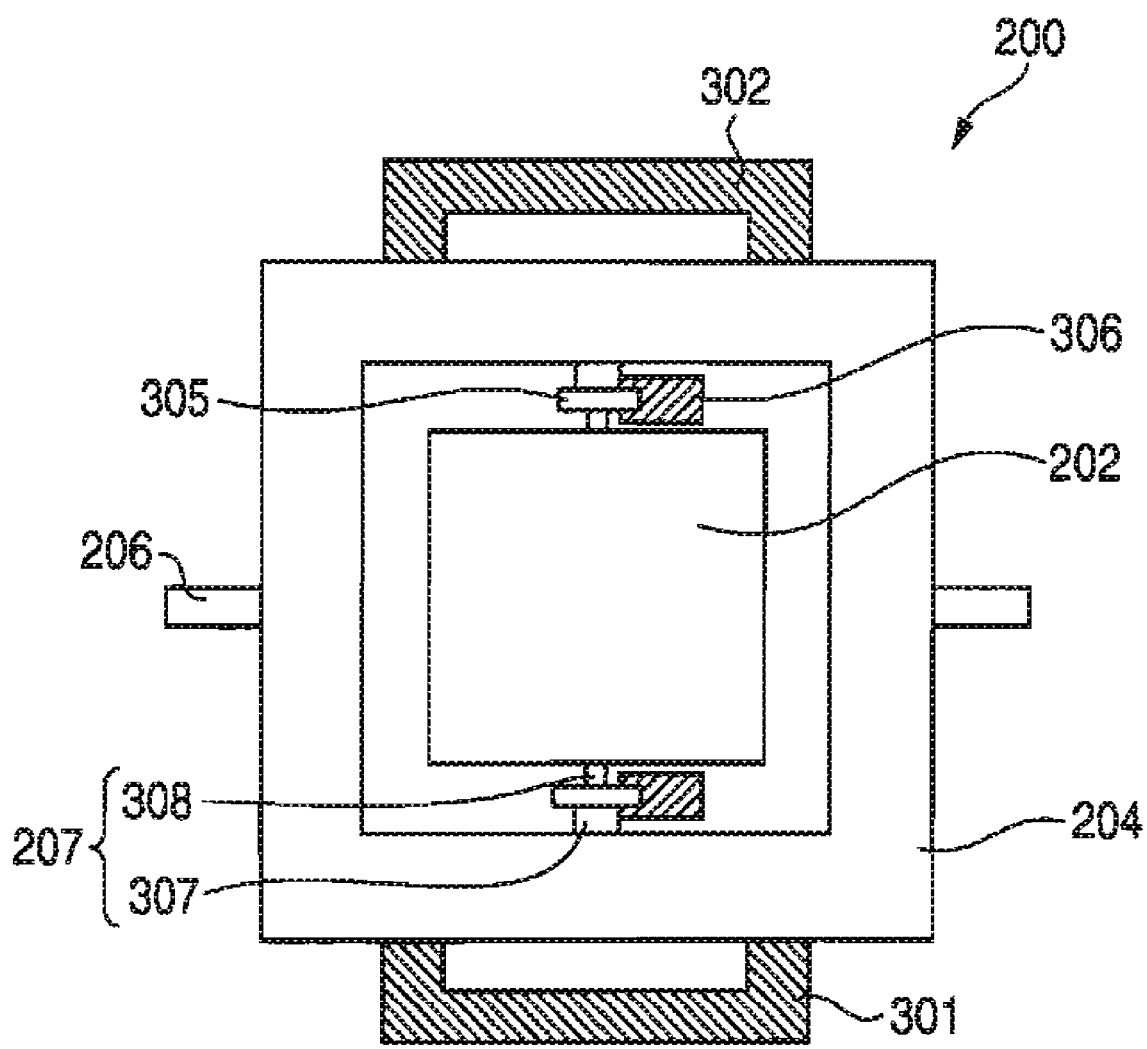
FIG. 3 is an explanatory diagram of a structure for driving the scanner.

FIG. 3 is an explanatory diagram of a structure for driving the scanner 200. Assuming that the surface of the reflecting mirror 202 which reflects laser light is a front surface, first electrodes 301 and 302 are disposed at substantially symmetrical positions about the torsion spring 206 in the space on the back of the outer frame 204. When voltage is applied to the first electrodes 301 and 302, a force responsive to the potential difference, e.g., electrostatic force, is generated between the first electrodes 301 and 302 and the outer frame 204. The outer frame 204 is turned around the torsion spring 206 when voltage is alternately applied to the first electrodes 301 and 302.

Specifically speaking, the torsion spring 207 is composed of a first torsion spring 307 and a second torsion spring 308. Between the first torsion spring 307 and the second torsion spring 308 is provided a mirror-side electrode 305. A second electrode 306 is disposed in the space on the back of each mirror electrode 305. When voltage is applied to the second electrodes 306, a force responsive to the potential difference, e.g., electrostatic force, is generated between the second electrode 306 and 302 and the mirror-side electrode 305. When voltage in the same phase is applied to both of the second electrodes 306, the reflecting mirror 202 is turned around the torsion spring 207. The scanner 200 thus deflects the laser light in two dimensions by turning the reflecting mirror 202. The scanner 200 can be produced by, e.g., a micro electro mechanical systems (MEMS) technique.

The scanner 200 displaces the reflecting mirror 202 so as to reciprocate laser light a plurality of times in the horizontal X direction while scanning the laser light in the vertical Y direction one time during the period of one frame of an image. The scanner 200 is driven so that the frequency at which laser light is scanned in the X direction, or the first direction, is higher than that at which laser light is scanned in the Y direction, or the second direction. For high-speed scanning of laser light in the X direction, it is preferable for the scanner 200 to resonate the reflecting mirror 202 around the torsion spring 207. The resonation of the reflecting mirror 202 can increase the displacement of the reflecting mirror 202. The increase in the displacement of the reflecting mirror 202 allows the scanner 200 to deflect laser light efficiently with low energy. The reflecting mirror 202 may be driven without resonation.

The scanner 200 may not necessarily be driven by electrostatic force due to the potential difference. For example, the scanner 200 may be driven either by electromagnetic force or using the contraction and expansion properties of a piezoelectric element. With the electromagnetic force, the scanner 200 can be driven by the electromagnetic force generated between the reflecting mirror 202 and a permanent magnet with current. The scanner 200 may include a reflecting mirror for scanning laser light in the X direction and a reflecting mirror for scanning laser light in the Y directions.

Referring back to FIG. 1, the laser light exiting from the scanner 200 passes through the projection system 103, and is then incident on a reflector 105. The reflector 105 is disposed on the inner surface of a housing 107 and in the position opposed to the screen 110. The reflector 105 reflects the laser light from the light scanning device 120 toward the screen 110. The housing 107 tightly seals the space in the housing 107. The screen 110 is disposed on a specified surface of the housing 107. The screen 110 is a transmissive screen that allows the laser light from the light scanning device 120 which is modulated according to an image signal to pass through. The light from the reflector 105 of the screen 110 is incident on the surface inside the housing 107 and then exits from the surface on the viewer side. The viewer views images with the light exiting from the screen 110.

Figure 4:
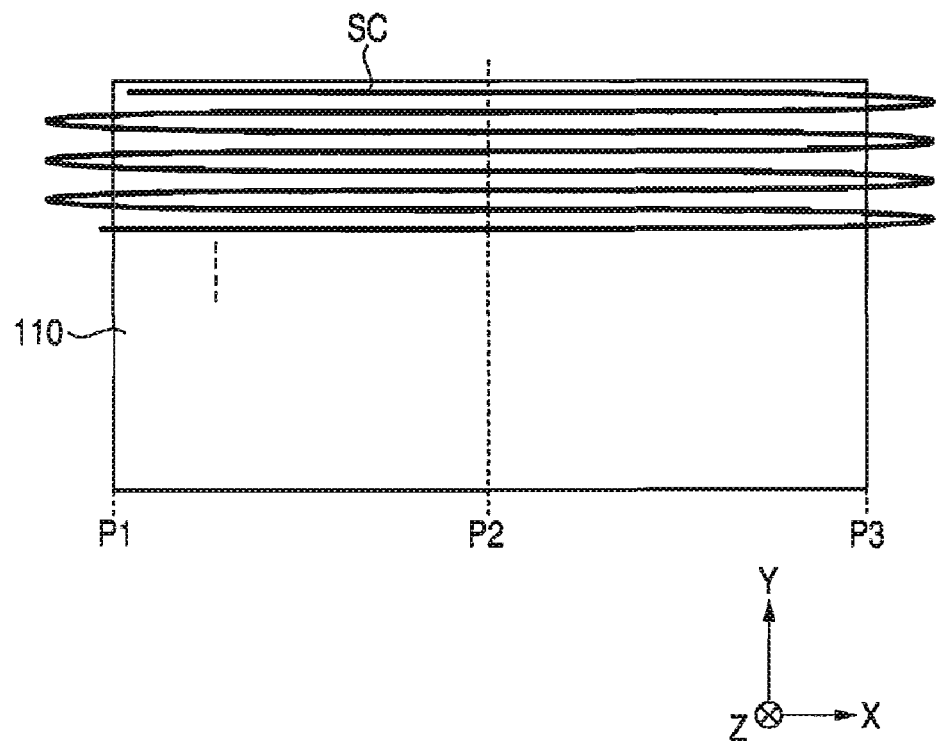
FIG. 4 is an explanatory diagram of the scanning of laser light over a screen.

FIG. 4 shows the scanning of laser light over the screen 110. The scanner 200 deflects laser light from the pixel at the upper left of the screen 110 viewed from the incident side of the screen 110 in the plus X direction. Upon completion of the scanning of the pixels on the first line, the traveling direction of the laser light is changed from the plus X direction to the minus X direction. The scanner 200 scans the laser light in the minus X direction for the pixels on the second line. The laser light moves over the screen 110 while laying down a sine-wave scanning trail SC that oscillates in the X direction by repeating such scanning.

Figure 5:
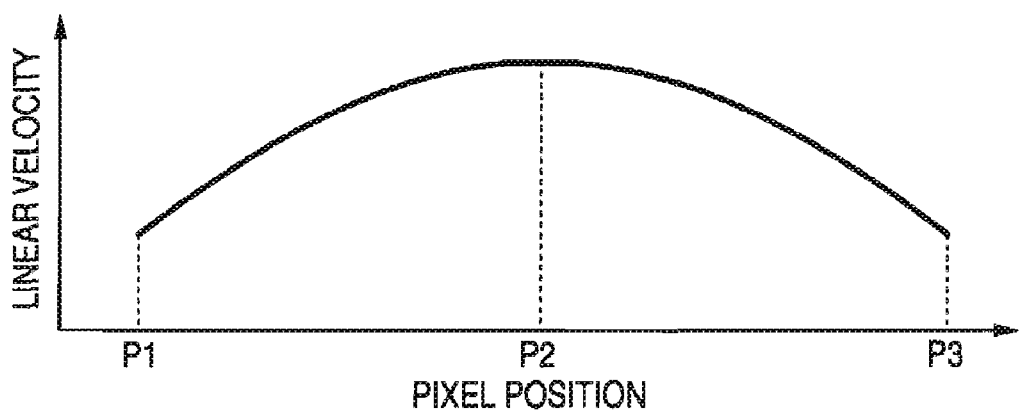
FIG. 5 is an explanatory diagram of the relationship between the linear velocity of laser light and the position of pixels.

FIG. 5 describes the relationship between the linear velocity of the laser light in the X direction and the position of pixels in the X direction shovel in FIG. 4. The linear velocity of the laser light becomes the minimum at the left end P1 and the right end P3 close to the positions where the traveling direction is changed, and becomes the maximum at the center P2 that is the center of the positions where the traveling direction is changed. Accordingly, even when the laser light is modulated on the basis of the time obtained by simply dividing the time between the timing at which the laser light passes through the left end P1 and the timing at which the laser light passes through the right end P3 by the number of pixels, pixels are displayed small at the center P2, and large at the both ends P1 and P3.

Accordingly, the light scanning device 120 generates a driving signal for the light source 101 using a pixel timing signal generated on the basis of the linear velocity of the laser light. The pixel timing signal indicates a timing at which laser light is incident for every pixel region. The use of the pixel timing signal allows laser light modulated in accordance with an image signal to enter an accurate position even if the linear velocity of the laser light changes. The scanner 200 may be driven so that the frequency at which the laser light is deflected in the Y direction is higher than that for X direction. In this case, the Y direction is a first direction, and the X direction is a second direction.

Figure 6:
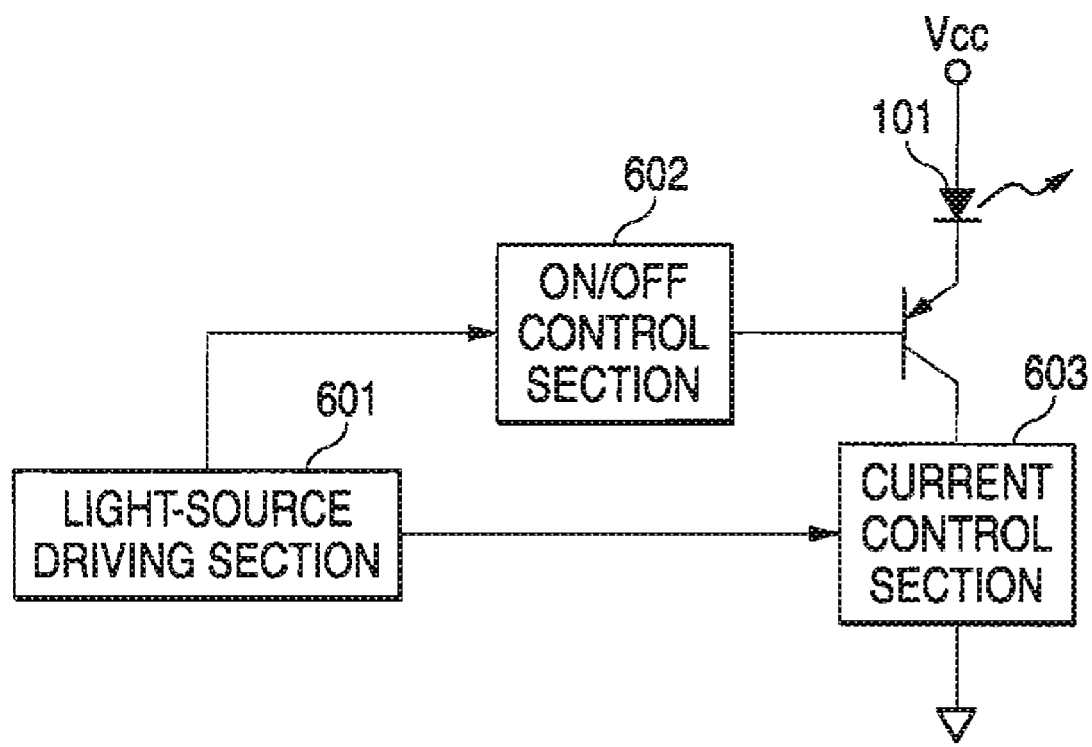
FIG. 6 is an explanatory diagram of a structure for controlling the driving of a light source.

FIG. 6 describes a structure for controlling the driving of the light source 101. A light-source driving section 601 drives the light source 101 on the basis of a driving signal. An ON/OFF control section 602 controls the ON and Off of the light source 101 in accordance with the pulse width of the driving signal. A current control section 603 controls the amount of the laser light from the light source 101 in accordance with the amplitude of the driving signal. The light scanning device 120 of this embodiment modulates laser light by an analog system using a driving signal whose amplitude is controlled according to an image signal.

Figure 7:
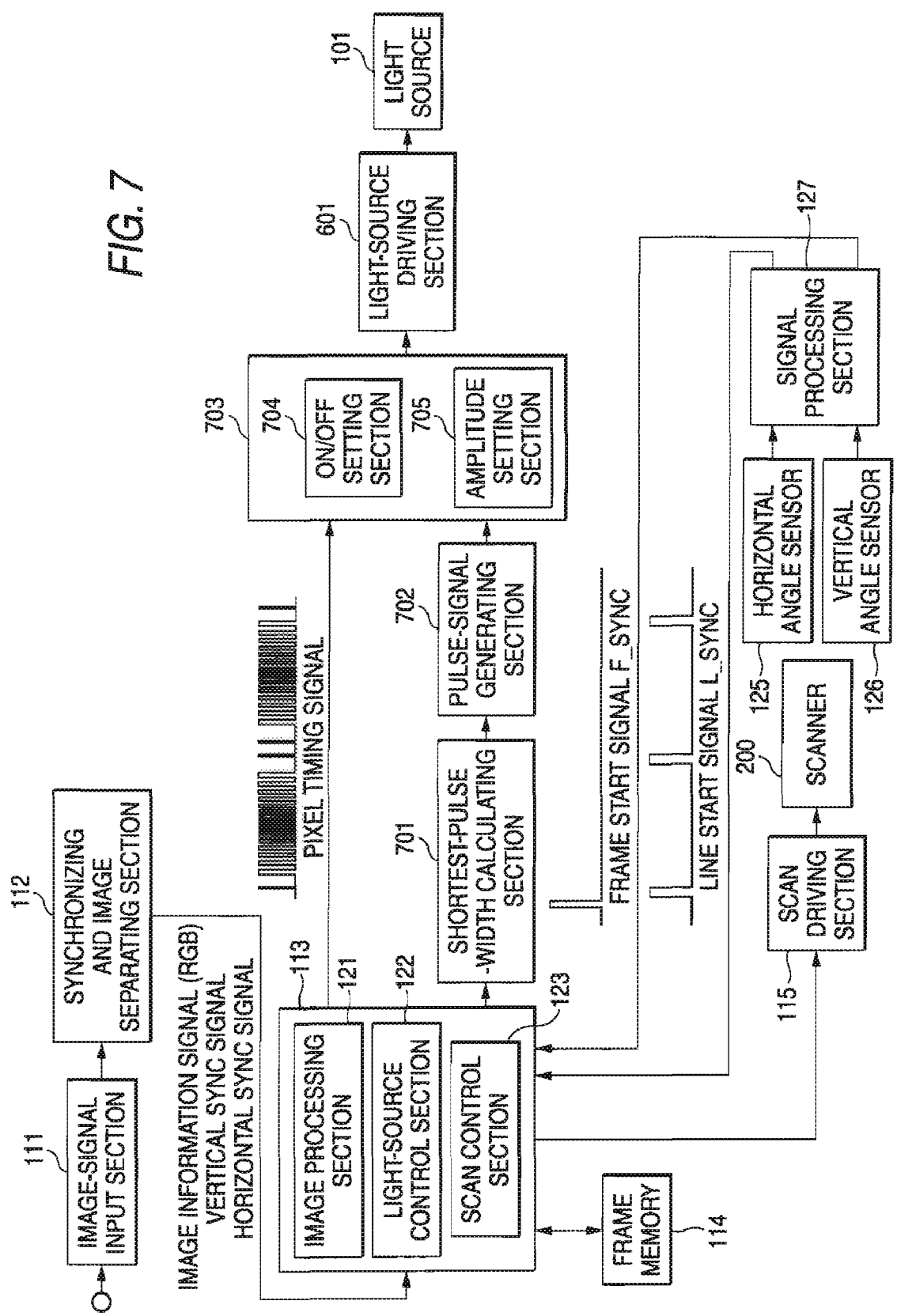
FIG. 7 is an explanatory diagram of a structure for controlling laser-light scanning.
Figure 8:
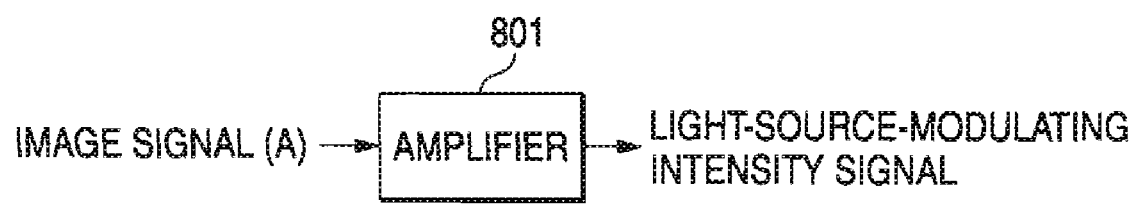
FIG. 8 is an explanatory diagram of a conversion of an image signal by an image-signal input section.

FIG. 7 describes a structure for controlling laser-light scanning. An image-signal input section 111 corrects the characteristics of an image signal input from an input terminal, the amplitude of the image signal, and the like. For example, as shown in FIG. 8, the image-signal input section 111 amplitudes an analog image signal with an amplifier 801 to thereby output an analog light-source-modulating intensity signal. Referring back to FIG. 7, a synchronizing and image separating section 112 separates the signal from the image-signal input section 111 into an image information signal, a vertical sync signal, a horizontal sync signal for each of R light, G light, and B light, and outputs them to a control section 113. Of the control section 113, a scan control section 123 generates a driving signal for driving the scanner 200 according to the vertical sync signal and the horizontal sync signal. A scan driving section 115 drives the scanner 200 in response to the driving signal from the control section 113.

A horizontal angle sensor 125 senses the turning angle of the reflecting mirror 202 (refer to FIG. 2) that moves or scans the laser light in the X direction over the screen 110. A vertical angle sensor 126 senses the turning angle of the reflecting mirror 202 that moves or scans the laser light in the Y direction over the screen 110. A signal processing section 127 generates a frame start signal F_Sync from the displacement of the vertical angle sensor 126, and a line start signal L_Sync from the displacement of the horizontal angle sensor 125, respectively, and outputs them to the control section 113.

An image processing section 121 divides the image information input to the control section 113 for every scanning line, and outputs them to a frame memory 114. The frame memory 114 stores the image signals from the image processing section 121 frame by frame. A light-source control section 122 outputs line-by-line image information signals read from the frame memory 114. The control section 113 generates a pixel timing signal on the basis of a linear velocity calculated from the frame start signal F_Sync and the line start signal L_Sync and the vertical sync signal and the horizontal sync signal. The control section 113 is a pixel timing generating section that generates a pixel timing signal. The control section 113 may generate a pixel timing signal on the basis of a signal from a detector that senses the position of laser light, in addition to the pixel timing signal based on the calculated linear velocity. In addition to the control section 113, a pixel timing generating section and a linear-velocity calculating section for calculating the linear velocity of laser light may be provided.

A shortest-pulse-width calculating section 701 derives a pulse width corresponding to time shorter than the shortest of the time during which laser light passes through a pixel region by calculation based on a pixel timing signal. A pulse-signal generating section 702 generates a pulse signal having a pulse width determined by the shortest-pulse-width calculating section 701. An ON/OFF setting section 704 of a driving-signal generating section 703 sets the switching between ON and OFF in synchronization with the pulse signal from the pulse-signal generating section 702. An amplitude setting section 705 of the driving-signal generating section 703 sets amplitude in accordance with an analog light-source-modulating intensity signal.

Figure 9:
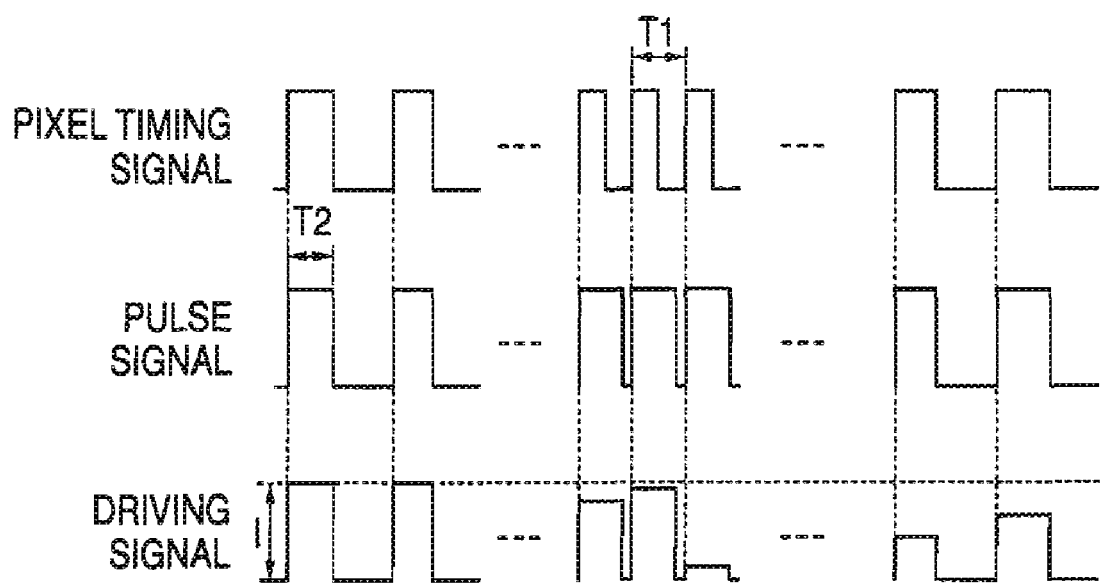
FIG. 9 is an explanatory diagram of a driving signal generated by a driving-signal generating section.

FIG. 9 is an explanatory diagram of a driving signal generated by the driving-signal generating section 703. FIG. 9 shows examples of a pixel timing signal, a pulse signal, and a driving signal for pixels at the left end, at the center, and at the right end of one scanning line. The pixel timing signal switches from L to H at the timing at which laser light enters a pixel region. The time between the timings at which the pixel timing signal switches from L to H corresponds to the time during which the laser light passes the pixel region. The linear velocity of laser light is low at the left end and at the right end in the object region, and high at the center, as described above. Accordingly, the time T1 between the timings at which the pixel timing signal switches from L to H at the center of the object region is the shortest of the time during which the laser light passes through the pixel region.

The shortest-pulse-width calculating section 701 derives a pulse width T2 corresponding to time shorter than the time T1 from the pixel timing signal. The pulse-signal generating section 702 generates a pulse signal that switches from L to H at the same timing as that of the pixel timing signal and having a pulse width T2 determined by the shortest-pulse-width calculating section 701. The driving-signal generating section 703 determines an amplitude according to the gray level, with a predetermined amplitude I as the maximum value. In this way, the driving-signal generating section 703 generates a driving signal for driving the light source 101 on the basis of the pulse signal from the pulse-signal generating section 702 and the image signal. The image signal input in analog form is output as an amplitude-controlled driving signal from the driving-signal generating section 703. The light scanning device 120 can thus control the amount of laser light accurately by amplitude control.

The light scanning device 120 generates a driving signal with reference to the pulse signal with a pulse width T2 for all the pixels. Assuming that the intensity of light that a viewer senses with eyes is the product of the intensity and the lighting time of light, laser light responsive to an image signal can be emitted irrespective of the linear velocity of the laser light by generating a driving signal based on a pulse signal with the same pulse width. Accordingly, even if the linear velocity of laser light changes, substantially even laser light can be emitted without deviation. Since the driving signal is generated using a pixel timing signal, light with preferable distribution can be scanned to the pixel regions.

The light scanning device 120 performs calculation using the linear velocity of laser light only for determining the pulse width of a pulse signal, and thereafter generates a driving signal by a simple way using a pulse signal synchronized with the pixel timing signal. This facilitates controlling the light source 101 as compared with controlling the light source 101 on the basis of the linear velocity calculated for each pixel. This also facilitates generating a driving signal corresponding to changes in linear velocity of laser light. This offers the advantage that laser light can be scanned with preferable distribution by a simple control, thereby achieving high-quality image display.

Second Embodiment

Figure 10:
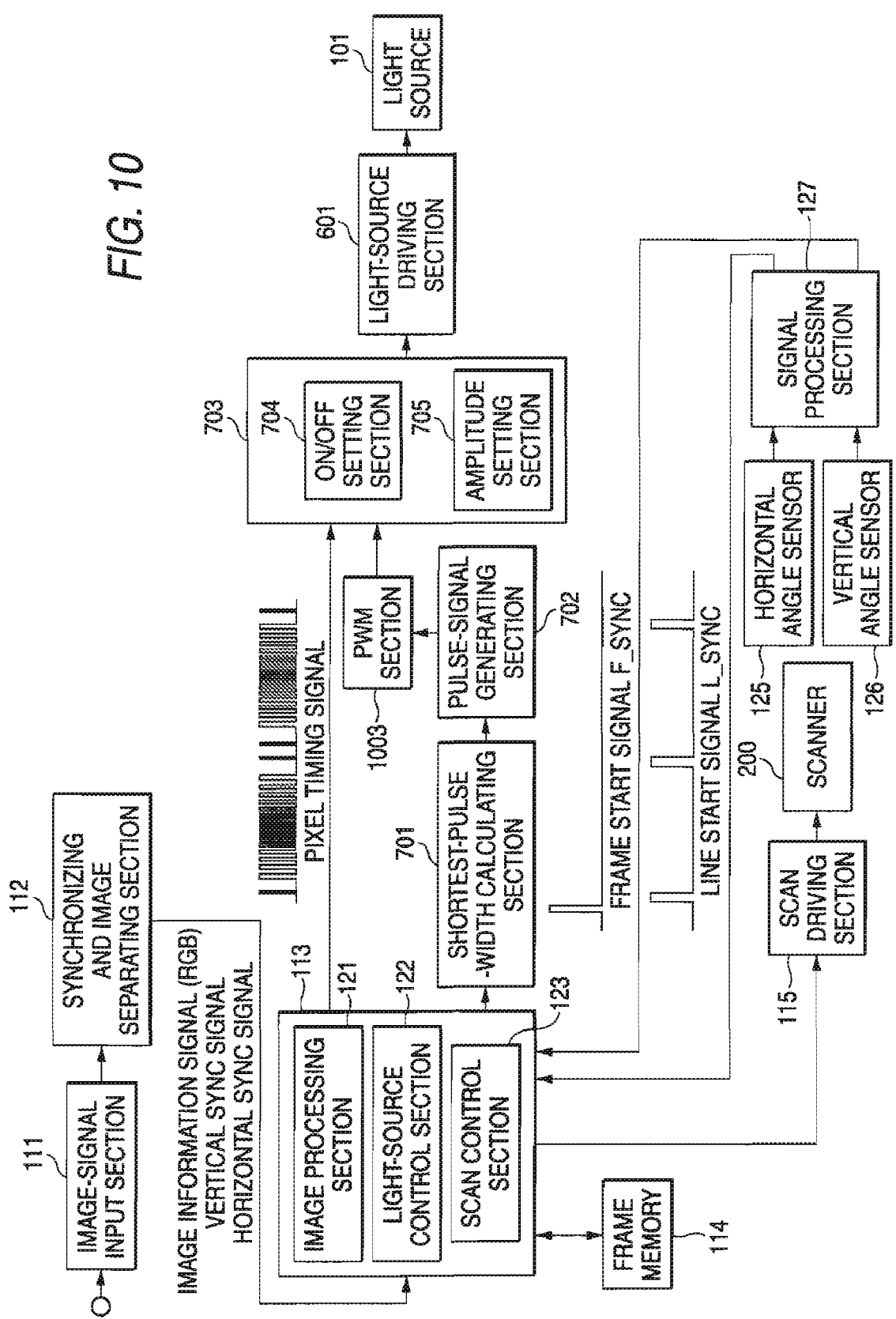
FIG. 10 is a block diagram of a light scanning device according to a second embodiment of the invention.
Figure 11:
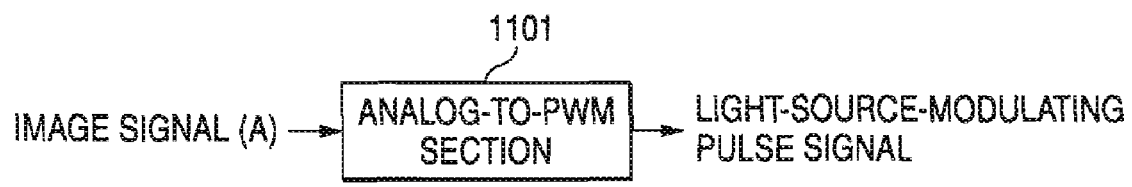
FIG. 11 is an explanatory diagram of a conversion of an image signal by an image-signal input section.

FIG. 10 is a block diagram of a light scanning device according to a second embodiment of the invention, showing a structure for controlling laser-light scanning. The light scanning device of this embodiment can be applied to the image display device 100 according to the first embodiment. The same components as those of the first embodiment are given the same reference numerals and a description thereof will be omitted. The light scanning device of this embodiment modulates the laser light from the light source 101 by pulse-width modulation (PWM). As shown in FIG. 11, the image-signal input section 111 converts an analog image signal to a digital light-source-modulating pulse signal with an analog-to-PWM section 1101.

As in the first embodiment, the pulse-signal generating section 702 generates a pulse signal with a pulse width calculated by the shortest-pulse-width calculating section 701. A PWM section 1003 generates a pulse signal based on image information in accordance with the light-source-modulating pulse signal. The ON/OFF setting section 704 of the driving-signal generating section 703 sets the switching between ON and OFF in synchronization with the pulse signal form the PWM section 1003. The amplitude setting section 705 of the driving-signal generating section 703 sets the amplitude to a specified value.

Figure 12:
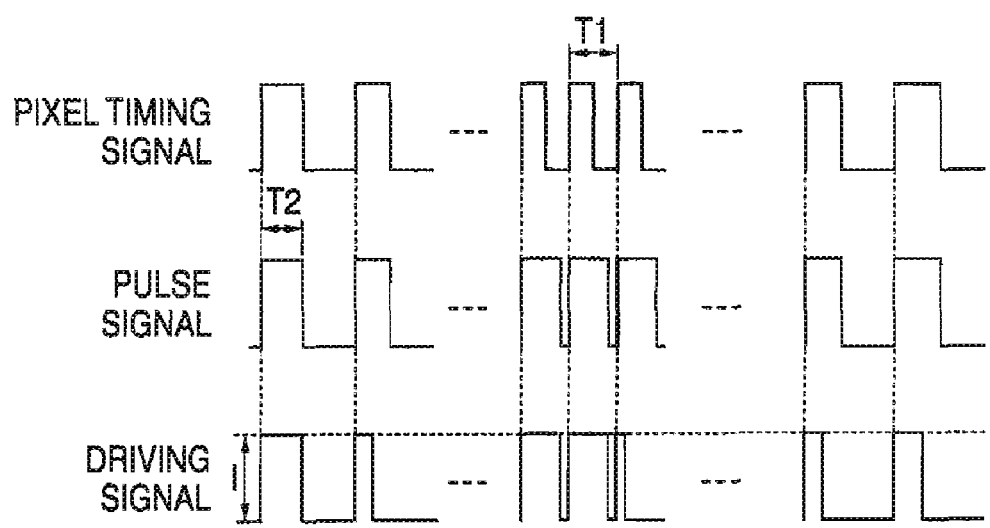
FIG. 12 is an explanatory diagram of a driving signal generated by the driving-signal generating section.

FIG. 12 is an explanatory diagram of a driving signal generated by the driving-signal generating section 703. FIG. 12 shows examples of a pixel timing signal, a pulse signal, and a driving signal for pixels at the left end, at the center, and at the right end of one scanning line. The process to generating a pulse signal having a pulse width T2 shorter than the time T1 by the pulse-signal generating section 702 is the same as that of the first embodiment. The PWM section 1003 determines a pulse width according to the gray level with the pulse width T2 as the maximum value. The driving-signal generating section 703 generates a driving signal having a pulse with the specified amplitude I and the pulse width T2 determined by the PWM section 1003. In this way, the driving-signal generating section 703 generates a signal for driving the light source 101 on the basis of the pulse signal from the pulse-signal generating section 702 and the image signal.

The image signal input as an analog signal is output as a pulse-width-controlled driving signal by the driving-signal generating section 703. The light scanning device can thus control the amount of laser light accurately by pulse-width control. This embodiment also facilitates laser-light scanning with preferable distribution by simple control, as in the first embodiment. The driving-signal generating section 703 may not always generate a driving signal whose pulse rises at the timing at which the pixel timing signal changes from L to H, but also may generate a driving signal whose pulse rises in the middle of the timings at which the pixel timing signal changes from L to H or directly before the pixel timing signal changes from L to H.

Figure 13:
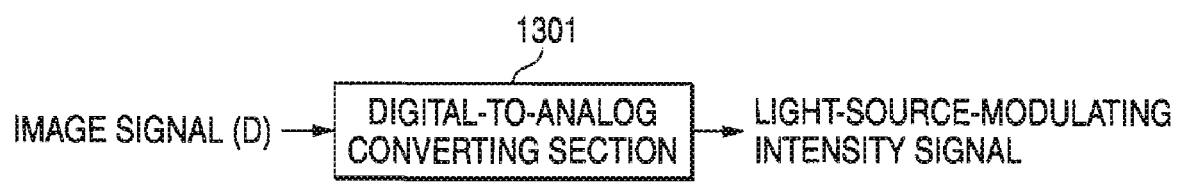
FIG. 13 is an explanatory diagram of a conversion of a digital image signal.

The light scanning device of the invention may not necessarily receive an analog image signal but may receive a digital image signal. For example, as shown in FIG. 13, the image-signal input section 111 may convert a digital image signal to an analog light-source-modulating intensity signal with a digital-to-analog conversion section 1301. With this structure, the image signal input as a digital signal is output as an amplitude-controlled driving signal.

Figure 14:
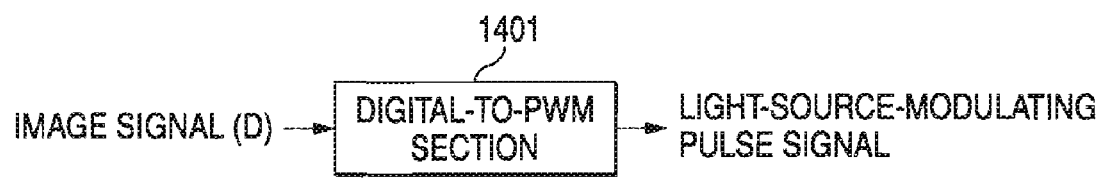
FIG. 14 is an explanatory diagram of a conversion of a digital image signal.

As shown in FIG. 14, the image-signal input section 111 may convert a digital image signal to a digital light-source-modulating pulse signal with a digital-to-PWM section 1401. With this structure, the image signal input as a digital signal is output as a pulse-width-controlled driving signal. The light scanning device of this embodiment can control the amount of light beams correctly on the basis of an image signal also when a digital image signal is input.

Third Embodiment

Figure 15:
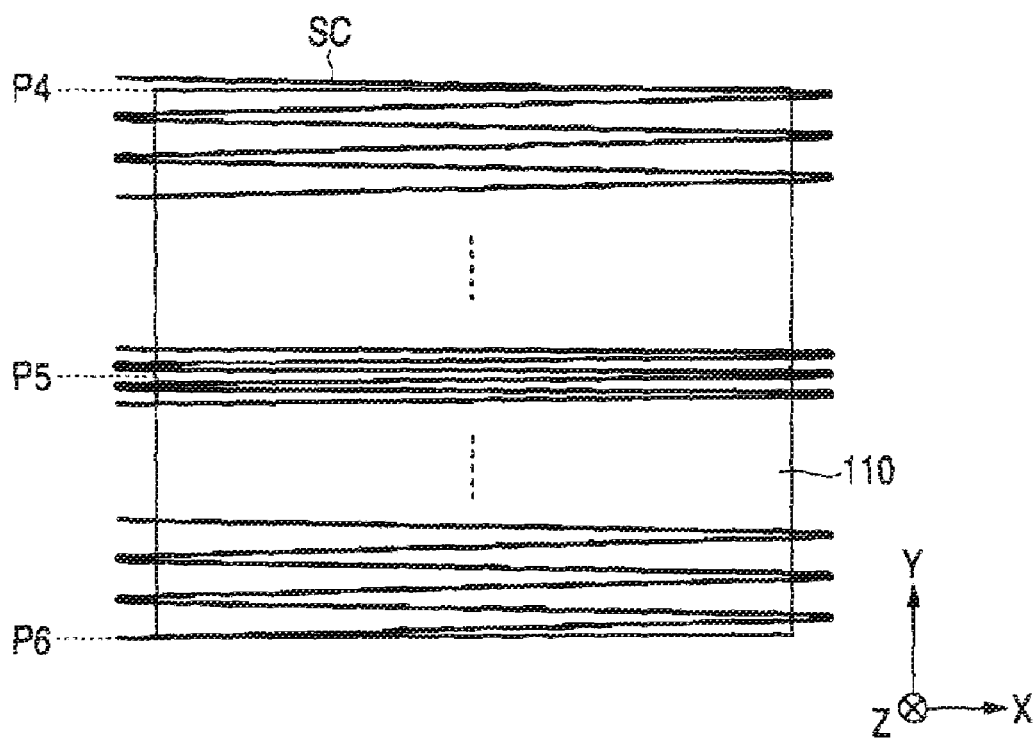
FIG. 15 is an explanatory diagram of an image display device according to a third embodiment of the invention.

FIG. 15 is an explanatory diagram of an image display device according to a third embodiment of the invention, showing a laser-light scan trail SC over the screen 110. This embodiment is characterized by generating a pulse signal using a pulse width corresponding to time shorter than the time during which laser light passes through a pixel region when the velocities of laser light deflected in the first direction and in the second direction are the maximum. The image display device of this embodiment has the same structure as that of the image display device 100 (refer to FIG. 1) of the first embodiment except that the control of the light source is different.

Figure 16:
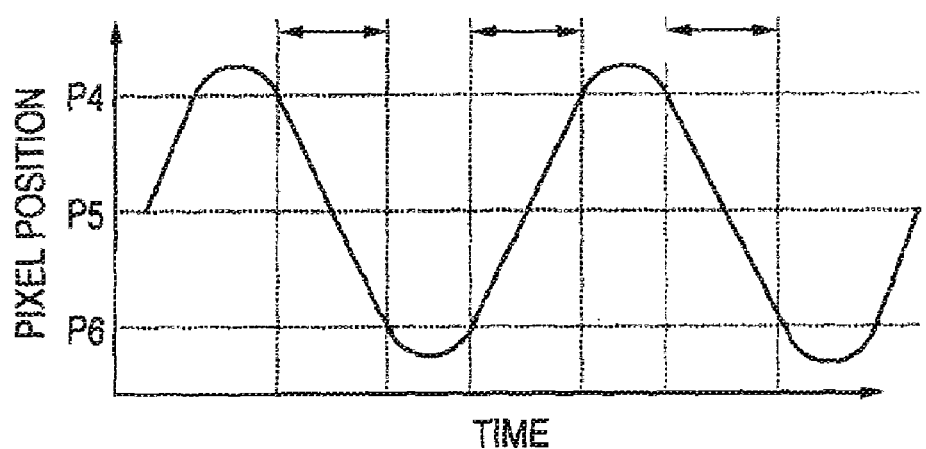
FIG. 16 is an explanatory diagram of changes in scanning position of laser light in a second direction.

FIG. 16 describes changes in scanning position of laser light in the Y direction, or the second direction. According to the embodiment, the light scanning device reciprocates laser light not only in the X direction, or the first direction, but also in the Y direction, or the second direction, with the scanner 200 shown in FIG. 3. The laser light is therefore deflected along a sine wave in the Y direction as in the X direction. Laser light is scanned over the screen 110 while the changes in position of the laser light with time are constant, as indicated by the arrow in the figure.

Figure 17:
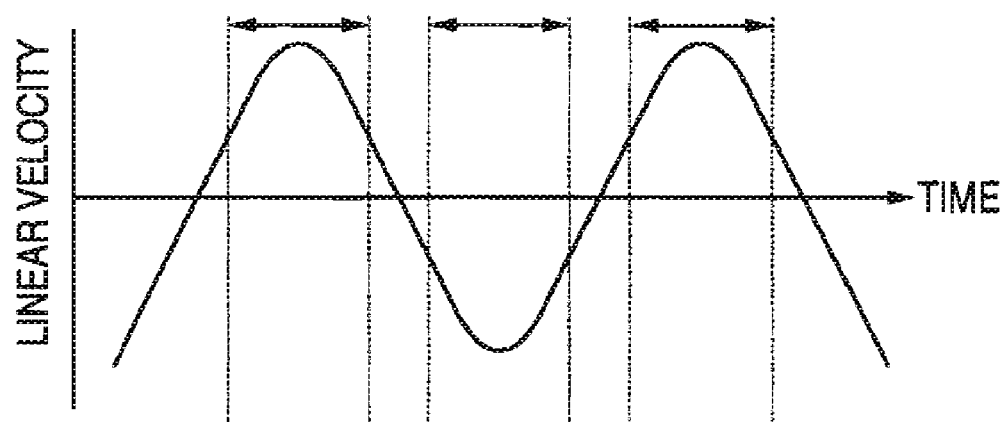
FIG. 17 is an explanatory diagram of changes in line velocity.

As shown in FIG. 17, the linear velocity of the laser light in the Y-direction becomes the maximum in the center of the period during which laser light is scanned over the screen 110 as in the X direction. Accordingly, the linear velocity of laser light in the Y direction becomes the minimum at the upper end P4 and the lower end P6 close to positions where the traveling direction of the laser light is changed, and becomes the maximum at the center P5 of the positions where the traveling direction of the laser light changes. When the linear velocity of the laser light in the Y direction becomes the maximum at the center P5, and becomes the minimum at the upper end P4 and the lower end P6, the amount of light disadvantageously becomes small in the vicinity of the center P5 of the screen 110 and becomes large in the vicinity of the upper end P4 and the lower end P6.

In this embodiment, the shortest-pulse-width calculating section 701 (refer to FIG. 7) derives a pulse width corresponding to time shorter than the time during which laser light passes through a pixel region when the velocities of laser light deflected in the X direction and in the Y direction are the maximum. Specifically, the shortest-pulse-width calculating section 701 first determines a position where the scanning speed of laser light becomes the maximum in the Y direction in which the frequency of laser light is lower of the X and Y directions ashen laser light is reciprocated in the Y direction, the scanning speed in the Y direction becomes the maximum at the center P5. The shortest-pulse-width calculating section 701 then derives a position where the scanning speed of laser light in the X direction becomes the maximum on the scanning line at the position where the scanning speed in the Y direction becomes the maximum. The shortest-pulse-width calculating section 701 derives the pulse width in this way.

In this embodiment, the scanning speed of laser light becomes the maximum at the center both in the X direction and the Y direction, which is the center of the screen 110. The shortest-pulse-width calculating section 701 derives a pulse width corresponding to the time shorter than the time during which laser light passes on a pixel in the center of the screen 110. The light source is controlled using a pulse signal generated with the pulse width thus determined, so that laser light can be radiated substantially equally in two dimensions, thereby providing preferable light distribution in two dimensions.

Figure 18:
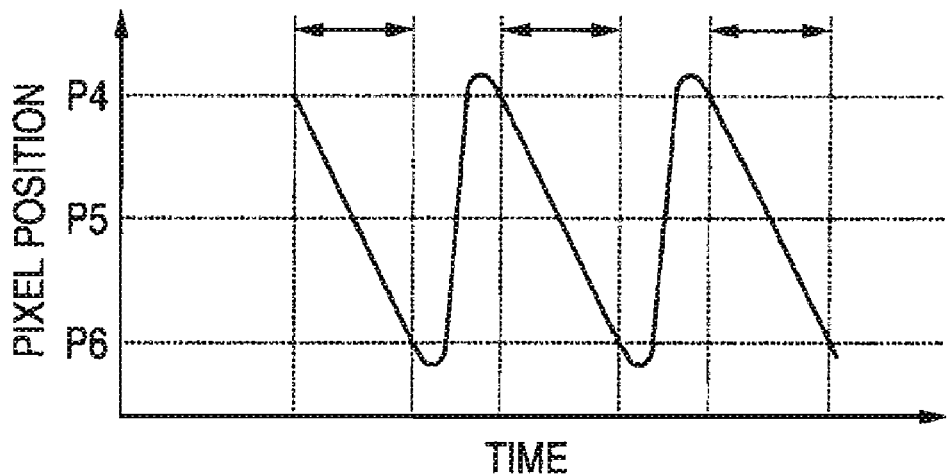
FIG. 18 is an explanatory diagram of a case in which laser light is deflected in one direction in the second direction.

The image display device of this embodiment may not necessarily reciprocate laser light in the Y direction, or the second direction, but may deflect laser light in one direction in the Y direction. The apparatus may deflect laser light, for example, as shown in FIG. 18 only downward in the Y direction, that is, from an upper end P4 to a lower end in the screen 110. The scanner repeats flyback scanning in which laser light is scanned downward, is then instantaneously changed from downward to upward, and is again deflected downward. In this case, laser light is scanned over the screen 110 while the changes in position of the laser light with time are constant, as indicated by the arrow in the figure.

Figure 19:
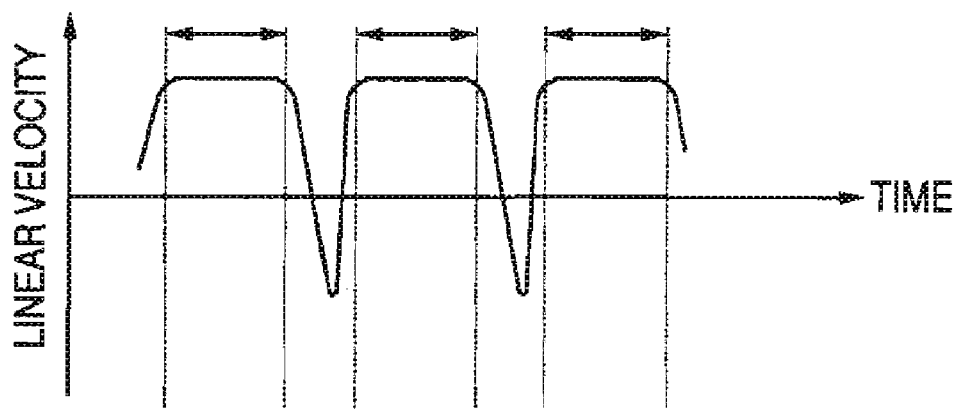
FIG. 19 is an explanatory diagram of changes in linear velocity.

FIG. 19 shows changes in linear velocity of laser light when laser light is deflected downward in the Y direction. The linear velocity of the laser light in the Y direction decreases directly after the traveling direction of the laser light changes from upward to downward and before it changes from downward to upward. Even when the linear velocity of laser light is changed by deflecting the laser light in one direction in the Y direction, preferable light distribution in two dimensions can be provided by determining the pulse width as in the case of reciprocating laser light. The pulse signal generated according to the embodiment may be converted either to an amplitude-controlled driving signal as in the first embodiment, or a pulse-width-controlled driving signal as in the second embodiment.

Fourth Embodiment

Figure 20:
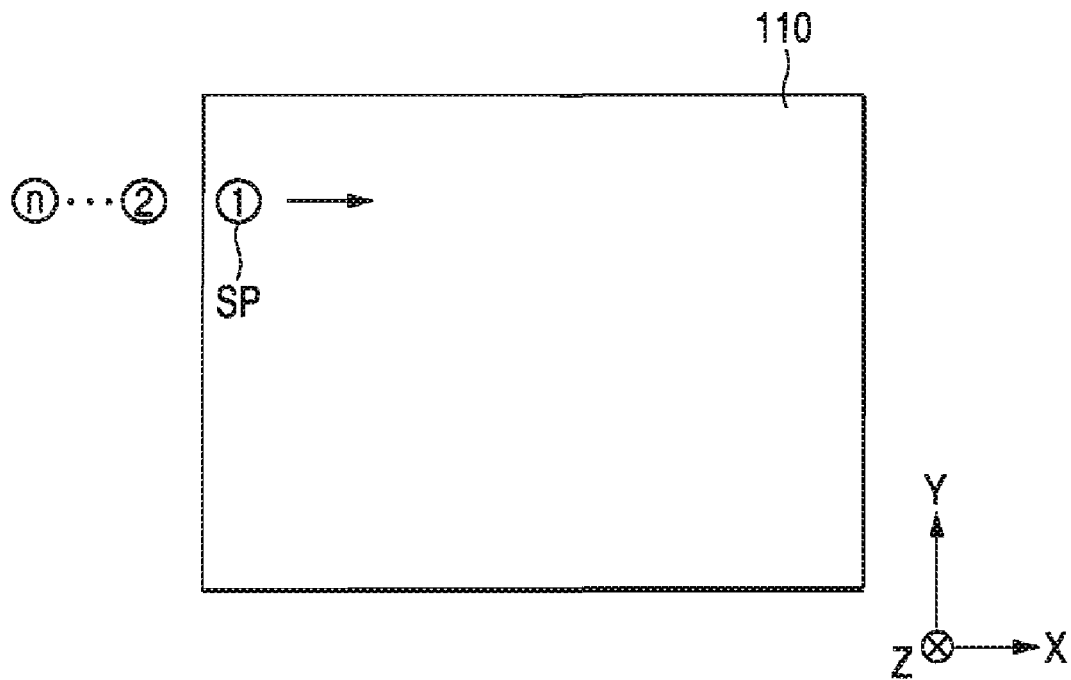
FIG. 20 is an explanatory diagram of an image display device according to a fourth embodiment of the invention.

FIG. 20 is an explanatory diagram of an image display device according to a fourth embodiment of the invention, showing a laser light spot SP formed on the screen 110. The image display device of this embodiment scans a plurality of laser lights of the same color. The lights of the same color indicate lights having the same or approximate wave-length region. The light source of the embodiment provides n laser lights of the same color. The image display device of this embodiment has the same configuration as that of the image display device 100 (refer to FIG. 1) of the first embodiment except that the configuration and control of the light source are different.

The light source emits the spots SP of the laser lights in line in the X direction, or the first direction. For example, a light-source array having a plurality of semiconductor lasers can be used as the light source for providing a plurality of laser lights of the same color. The light scanning device scans n laser lights from the light source with a single scanner. The n laser lights travels while maintaining the state in which the spots SP are arranged in line in the X direction. In place of the plurality of semiconductor laser, a semiconductor laser having a plurality of light emitters may be used as the light source.

Figure 21:
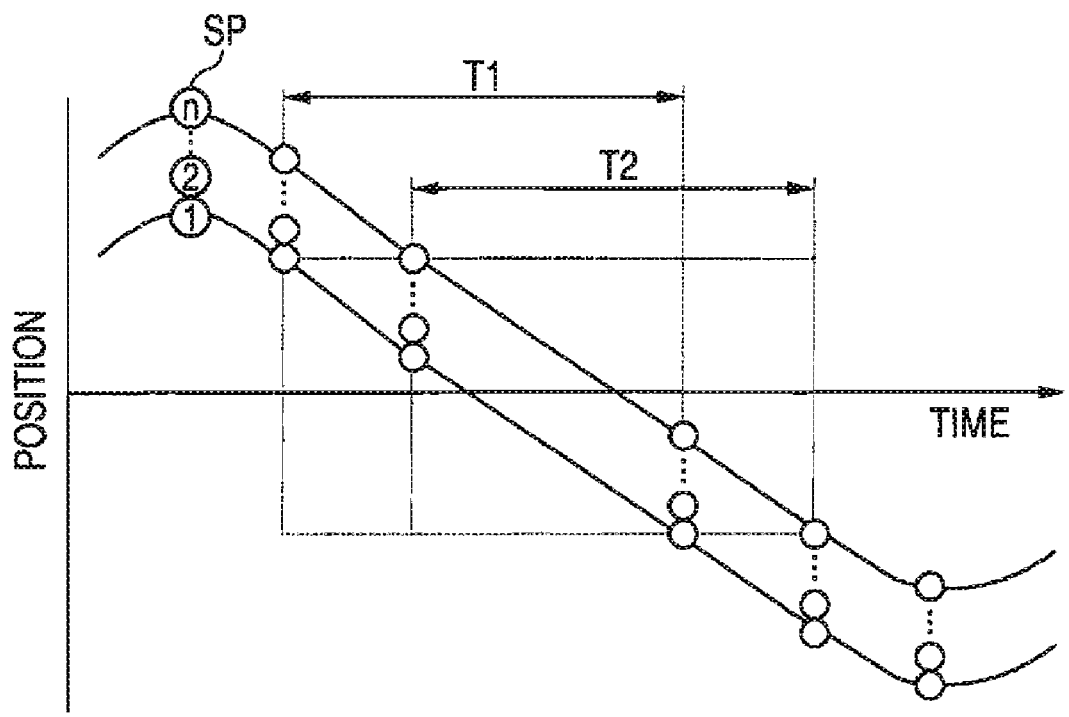
FIG. 21 is an explanatory diagram of changes in the position of laser light in a first direction.

FIG. 21 illustrates changes in the position of laser light in the X direction, or the first direction. A laser light 1 that is first incident on the upper left of the screen 110 (refer to FIG. 20) scans over the screen 110 during time T1. A laser light n that is last incident on the screen 110 after the scanning of the laser light I scans over the screen 110 during time T2 later than the laser light 1. In this case, the linear velocity of the laser light n at the start of scanning over the screen 110 is higher than that of the laser light 1 at the start of the scanning. Also, the linear velocity of the laser light n at the end of the scanning over the screen 110 is lower than that of the laser light 1 at the end of the scanning.

Figure 22:
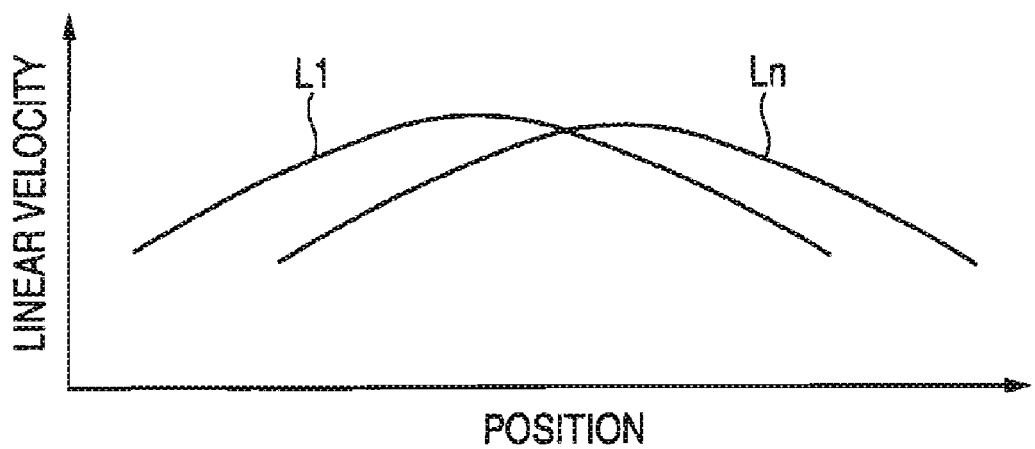
FIG. 22 is an explanatory diagram of changes in linear velocity when a plurality of laser lights is scanned.

FIG. 22 illustrates changes in the linear velocity L1 of the laser light 1, and the linear velocity Ln of the laser light n. When n laser lights are moved from the left to right in FIG. 20, the linear velocity L1 of the laser light 1 becomes the maximum at a position close to the scanning start position, while the linear velocity Ln of the laser light n becomes the maximum at a position close to the scanning end position. In contrast, when n laser lights are moved from the right to left, the linear velocity Ln of the laser light n becomes the maximum at a position close to the scanning start position, while the linear velocity L1 of the laser light 1 becomes the maximum at a position close to the scanning end position. With this embodiment, the position where the linear velocity becomes the maximum thus varies from laser light to laser light. In other words, even when a pulse signal is generated using a pulse width determined from the time at which laser light passes through the pixel in the center of the screen 110, substantially even light distribution cannot be provided.

Figure 23:
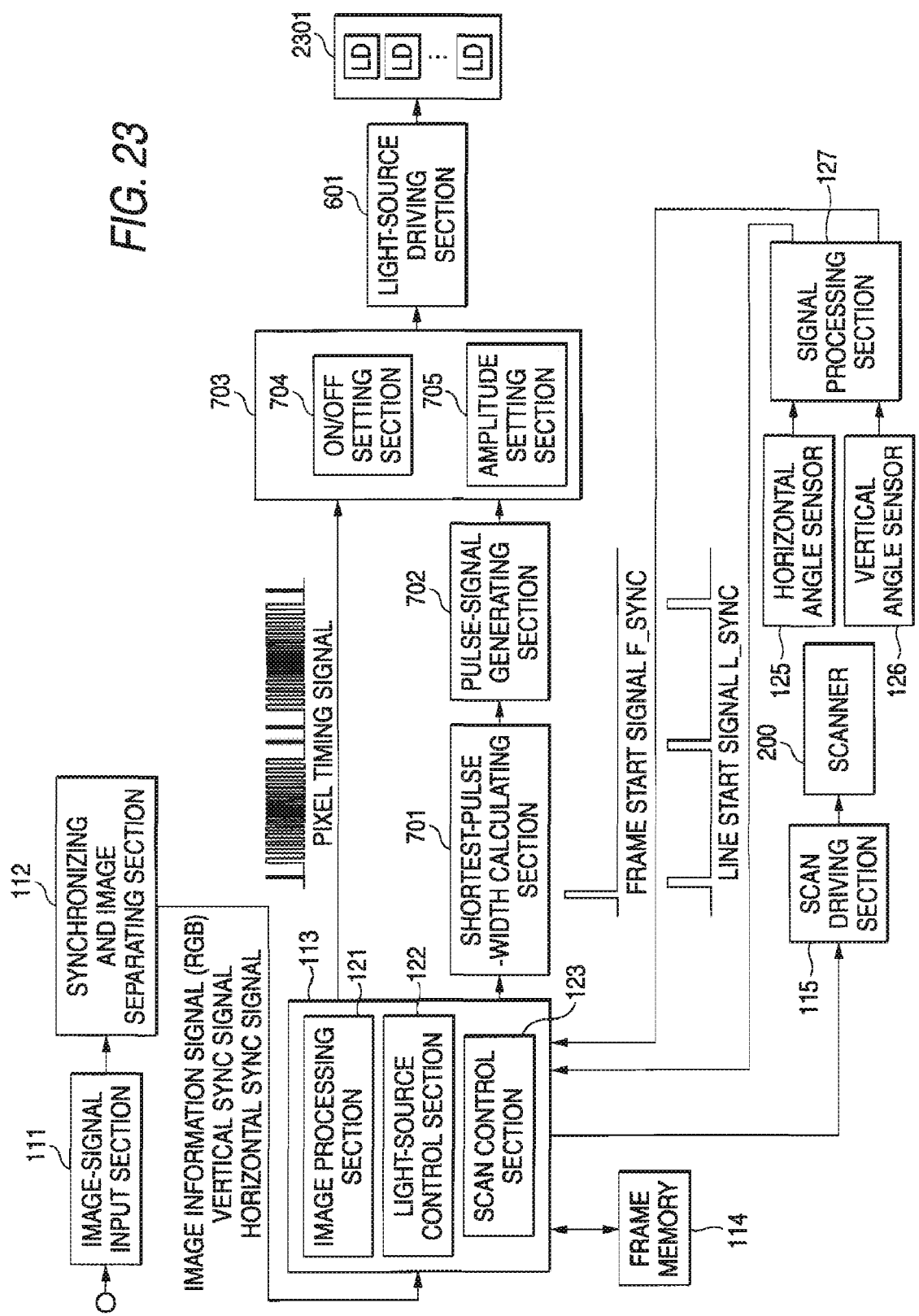
FIG. 23 is an explanatory diagram of a structure for controlling a laser-light scanning.

FIG. 23 illustrates a structure for controlling laser light scanning according to the embodiment. The shortest-pulse-width calculating section 701 derives a pulse width corresponding to time shorter than the shortest of the time during which one laser light of n laser lights passes through a pixel region. The pulse-signal generating section 702 generates a pulse signal for the semiconductor lasers LD of a light source unit 2301 in accordance with the output from the shortest-pulse-width calculating section 701. For example, for the laser light 1 of the n laser lights, a pulse width shorter than the shortest of the time during which the laser light 1 passes through a pixel region is derived. The pulse-signal generating section 702 generates pulse signals for the n laser lights using the pulse signal derived for the laser light 1.

A pulse signal having a pulse width calculated for one laser light is generated for all the laser lights. This makes it easier to control the light source unit 2301 than calculating a pulse width for every laser light, thereby providing preferable light distribution by simple control in scanning a plurality of light beams of the same color. This embodiment may be configured to generate a pulse signal for every laser light using a pulse width calculated for every laser light.

Fifth Embodiment

Figure 24:
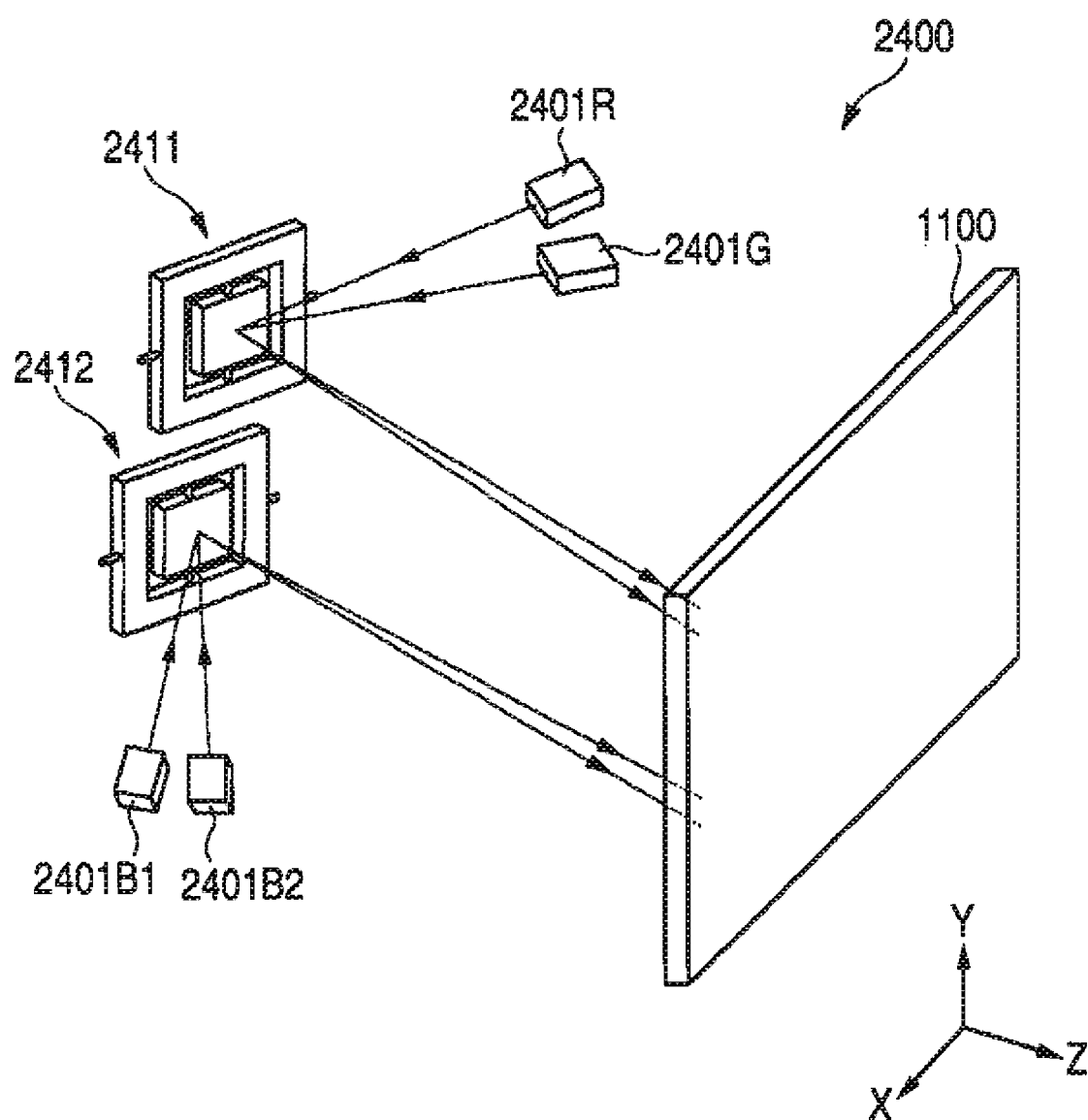
FIG. 24 is a diagram showing the structure of essential parts of a light scanning device according to a fifth embodiment of the invention.

FIG. 24 shows the structure of essential parts of a light scanning device 2400 according to a fifth embodiment of the invention. The light scanning device 2400 deflects R light, G light, and B light with a first scanner 2411 and a second scanner 2412. A R-light light source 2401R emits an R light beam. A G-light light source 2401G emits a G light beam. Two B-light light sources 2401B1 and 2401B2 emit B light beams with the same or different wavelengths.

The R light beam from the R-light light source 2401R and the G light beams from the G-light light source 2401G are incident on the first scanner 2411. The first scanner 2411 deflects the R light beam and the G light beam in the X direction and the Y direction over the screen 110. The B light beams from the two B-light light sources 2401B1 and 2401B2 are incident on the second scanner 2412. The second scanner 2412 deflects the B light beams in the X direction and the Y direction over the screen 110. The first scanner 2411 and the second scanner 2412 deflect the laser light roughly in the same cycle. The first scanner 2411 and the second scanner 2412 deflect the laser light in the X direction, or the first direction, at roughly the same speed, and in the Y direction, or the second direction, at roughly the same speed.

In this embodiment, the shortest-pulse-width calculating section 701 (refer to FIG. 7) derives a pulse width corresponding to time shorter than the shortest of the time during which one laser light from one of the two scanners 2411 and 2412 passes through a pixel region. The pulse-signal generating section 702 generates a pulse signal having the pulse width output from the shortest-pulse-width calculating section 701 for the laser lights to be deflected by the scanners 2411 and 2412. For example, for the R light deflected by the first scanner 2411, the shortest-pulse-width calculating section 701 determines a pulse width shorter than the shortest of the time during which the R light passes through a pixel region. The pulse-signal generating section 702 generates a pulse signal for each of color lights using the pulse width determined for the R light. The color light sources 2401R, 2401B, 2401G1, and 2401G2 are driven by the driving signals generated on the basis of the pulse signals from the pulse-signal generating section 702.

A pulse signal having a pulse width calculated for one laser light scanned by one scanner is generated for all the laser lights. This makes it easier to control the light source than calculating a pulse width for every laser light, thereby providing preferable light distribution by simple control in scanning light beams with a plurality of scanners. The light scanning device 2400 may not necessarily use two scanners provided that It uses a plurality of scanners. The combination of the scanners and color lights may also not be limited to that of this embodiment. The plurality of scanners may scan laser light at different speeds in the first and second directions. In this case, the pulse width can be determined for one of the laser lights scanned by the plurality of scanners, which passes the pixel region in the shortest time.

A modification of this embodiment will be described. The modification has the same configuration as that of the light scanning device 2400, except that the control of the first scanner 2411, the second scanner 2412, and the light sources is different. In this modification, the first scanner 2411 and the second scanner 2412 scan laser light in different cycles. The first scanner 2411 and the second scanner 2412 deflect laser light at different speeds in the X direction, or the first direction.

For example, in the screen 110 suppose that the spots of R light from the R-light light source 2401R and the spots of G light from the G-light light source 2401G are arranged in the Y direction. Also suppose that the spots of B light from the two B-light light sources 2401B1 and 2401B2 are arranged in the Y direction. The first scanner 2411 shifts the scanning position by line in the Y direction for the purpose of scanning the R and G lights for each scanning line. When the two B-light light sources 24001B1 and 2401B2 emit B lights with the same or approximate wave length, the second scanner 2412 can shift the scanning line on every other line. Accordingly, the second scanner 2412 scans laser light at about half of the speed of the first scanner 2411 so as to agree the frame periods of the first scanner 2411 and the second scanner 2412.

In this modification, the shortest-pulse-width calculating section 701 (refer to FIG. 7) derives a pulse width corresponding to time shorter than the shortest of the time during which one laser light deflected by the first scanner 2411, e.g., R light, passes through a pixel region. The pulse-signal generating section 702 in turn generates a pulse signal for each laser light deflected by the first scanner 2411 using the pulse width derived for the first scanner 2411. The pulse-signal generating section 702 generates pulse signals for R light and G light to be deflected by the first scanner 2411, using the pulse width determined for R light.

The shortest-pulse-width calculating section 701 derives a pulse width corresponding to time shorter than the shortest of the time during which one laser light deflected by the second scanner 2412, e.g., B light from the B-light light source 2401B1, passes through a pixel region. The pulse-signal generating section 702 in turn generates a pulse signal for each laser light deflected by the second scanner 2414, using the pulse width derived for the second scanner 2412. The pulse-signal generating section 702 generates pulse signals for two B lights to be deflected by the second scanner 2412, using the pulse width determined for the B light from the B-light light source 2401B1.

Generating pulse signals using the pulse widths calculated for every scanner provides substantially even distribution of laser light, thereby providing preferable light distribution using pulse signals set for every scanner. The modification may not necessarily have two scanners provided that it has a plurality of scanners. The modification may not necessarily scan laser light at different speeds in the first direction with a plurality of scanners provided that it scans laser light at different speeds in at least one of the first and second directions. Pulse signals may be generated using pulse widths calculated for every scanner even when laser light is scanneded at roughly the same speed in both of the first and second directions.

Sixth Embodiment

Figure 25:
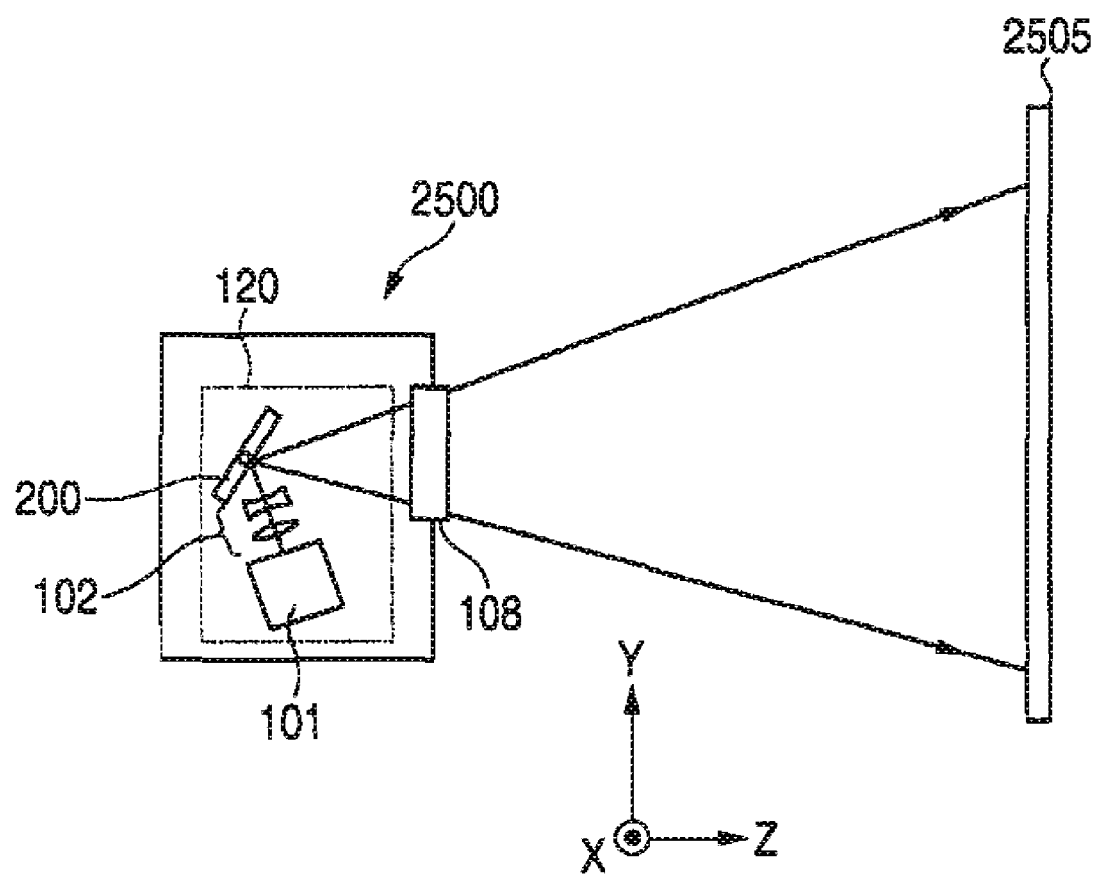
FIG. 25 is a diagram showing a schematic configuration of an image display device according to a sixth embodiment of the invention.

FIG. 25 shows a schematic structure of an image display device 2500 according to a sixth embodiment of the invention. The image display device 2500 is what is called a front scanner that scans laser light onto a screen 2505 on the viewer side for image viewing with the light reflected from the screen 2505. The image display device 2500 includes the light scanning device 120, as in the first embodiment. The same components as those of the first embodiment are given the same reference numerals and a description thereof will be omitted. The laser light from the light scanning device 120 passes through the projection system 103 and is then incident on the screen 2505. This embodiment also facilitates scanning of light beams with preferable distribution by simple control, thereby providing high-quality image viewing.

While the light scanning devices of the above-described embodiments include a laser light source, another light source is possible provided that it can emit light beams. For example, the light source may use a solid-state light emitting element such as a light-emitting diode (LED). The light scanning device of the invention may be used not only in an image display device but also in electronic equipment that emits laser light such as laser printers.

The light scanning device of the invention is suitable for use in an image display device that scans light in response to an image signal.

The entire disclosure of Japanese Patent Application Nos: 2005-119331, filed Apr. 18, 2005 and 2006-021977, filed Jan. 31, 2006 are expressly incorporated by reference herein.

What is claimed is:

1. A light scanning device that scans light beams modulated in response to image signals, the light scanning device comprising:
    a light source that emits the light beams;
    a scanning section that scans the light beams from the light source in a first direction and a second direction substantially perpendicular to the first direction;
    a pixel-timing-signal generating section that generates a pixel timing signal indicative of a timing at which the light beam enters for every pixel region to be formed in response to the image signals;
    a pulse-signal generating section that generates a pulse signal having a pulse width corresponding to time shorter than the shortest of the time during which the light beam passes through the pixel region on the basis of the pixel timing signal; and
    a driving-signal generating section that generates a driving signal for driving the light source in accordance with the pulse signal and the image signal.

2. The light scanning device according to claim 1, wherein the driving-signal generating section generates the driving signal whose amplitude is controlled in accordance with the image signal.

3. The light scanning device according to claim 1, wherein the driving-signal generating section generates the driving signal whose pulse width is controlled in accordance with the image signal.

4. The light scanning device according to claim 1, wherein the driving-signal generating section generates the driving signal in accordance with the image signal that is an analog signal.

5. The light scanning device according to claim 1, wherein the driving-signal generating section generates the driving signal in accordance with the image signal that is a digital signal.

6. The light scanning device according to claim 1, wherein the pulse-signal generating section generates a pulse signal having a pulse width corresponding to time shorter than the time during which the light beam passes through the pixel region when both of the velocity at which the light beam is scanned in the first direction and the velocity at which the light beam is scanned in the second direction are the maximum.

7. The light scanning device according to claim 6, wherein the scanning section is driven so that the frequency at which the light beam is scanned in the first direction is higher than that at which the light beam is scanned in the second direction, and so as to reciprocate the light beam in the second direction.

8. The light scanning device according to claim 6, wherein the scanning section is driven so that the frequency at which the light beam is scanned in the first direction is higher than that at which the light beam is scanned in the second direction, and so as to scan the light beam in one direction in the second direction.

9. The light scanning device according to claim 1, wherein:
    the light source emits a plurality of the light beams of the same color;

the scanning section scans the plurality of the light beams of the same color in line; and the pulse-signal generating section generates a pulse signal for the plurality of the light beams of the same color, the pulse signal having a pulse width corresponding to the time shorter than the shortest of the time during which one of the plurality of the light beams of the same color passes through the pixel region.

10. The light scanning device according to claim 1, wherein:

there is provided a plurality of the scanning sections; and the pulse-signal generating section generates a pulse signal to each of light beams scanned by the plurality of scanning sections, the pulse width having a pulse width corresponding to the time shorter than the shortest of the time during which one light beam scanned by one of the plurality of scanning sections passes through the pixel region.

11. The light scanning device according to claim 1, wherein:

the scanning section includes a first scanning section and a second scanning section; and the pulse-signal generating section generates a first pulse signal for the light beams scanned by the first scanning section and a second pulse signal for the light beams scanned by the second scanning section, the first pulse signal having a pulse width corresponding to the time shorter than the shortest of the time during which one of the light beams scanned by the first scanning section passes through the pixel region, and the second pulse signal having a pulse width corresponding to the time shorter than the shortest of the time during which one of the light beams scanneded by the second scanning section passes through the pixel region.

12. A method for controlling a light scanning device that scans light beams modulated in response to image signals, the method comprising:

emitting the light beams;

scanning the light beams emitted in the light emitting step in a first direction and a second direction substantially perpendicular to the first direction;

generating a pixel timing signal indicative of a timing at which the light beam enters for every pixel region to be formed in response to the image signals;

generating a pulse signal having a pulse width corresponding to time shorter than the shortest of the time during which the light beam passes through the pixel region on the basis of the pixel timing signal; and generating a driving signal for driving the light source in accordance with the pulse signal and the image signal.

13. An image display device for displaying images with the light from a light scanning device, wherein the light scanning device is the light scanning device according to claim 1.

* * * * *